United States Patent
Peoples et al.

(10) Patent No.: US 9,087,293 B2
(45) Date of Patent: Jul. 21, 2015

(54) CATEGORIZING CONCEPT TYPES OF A CONCEPTUAL GRAPH

(75) Inventors: Bruce E. Peoples, State College, PA (US); Michael R. Johnson, State College, PA (US); Jonathon P. Smith, Port Matilda, PA (US)

(73) Assignee: RAYTHEON COMPANY, Waltham, MA (US)

( * ) Notice: Subject to any disclaimer, the term of this patent is extended or adjusted under 35 U.S.C. 154(b) by 757 days.

(21) Appl. No.: 12/342,580

(22) Filed: Dec. 23, 2008

(65) Prior Publication Data
US 2010/0161669 A1  Jun. 24, 2010

(51) Int. Cl.
*G06F 7/00* (2006.01)
*G06F 17/30* (2006.01)
*G06N 5/02* (2006.01)

(52) U.S. Cl.
CPC .................................. *G06N 5/02* (2013.01)

(58) Field of Classification Search
USPC .................................................. 707/736, 791
See application file for complete search history.

(56) References Cited

U.S. PATENT DOCUMENTS

| | | | |
|---|---|---|---|
| 4,964,063 A | | 10/1990 | Esch |
| 6,076,088 A * | | 6/2000 | Paik et al. ............................ 1/1 |
| 6,169,986 B1 | | 1/2001 | Bowman et al. |
| 6,263,335 B1 * | | 7/2001 | Paik et al. ............................ 1/1 |
| 6,523,028 B1 | | 2/2003 | DiDomizio et al. |
| 6,678,677 B2 | | 1/2004 | Roux et al. |
| 6,847,979 B2 | | 1/2005 | Allemang et al. |
| 7,031,909 B2 | | 4/2006 | Mao et al. |
| 7,139,755 B2 | | 11/2006 | Hammond |
| 7,225,183 B2 | | 5/2007 | Gardner |
| 7,428,529 B2 | | 9/2008 | Zeng et al. |
| 7,539,619 B1 | | 5/2009 | Seligman et al. |
| 7,555,472 B2 | | 6/2009 | Craig et al. |
| 7,685,118 B2 | | 3/2010 | Zhang |
| 7,761,298 B1 | | 7/2010 | Pereira et al. |
| 7,853,555 B2 | | 12/2010 | Peoples et al. |
| 7,882,143 B2 | | 2/2011 | Smyros et al. |
| 7,991,608 B2 | | 8/2011 | Johnson et al. |
| 2002/0002454 A1 | | 1/2002 | Bangalore et al. |
| 2002/0022955 A1 | | 2/2002 | Troyanova et al. |
| 2002/0022956 A1 | | 2/2002 | Ukrainczyk et al. |
| 2002/0087313 A1 * | | 7/2002 | Lee et al. ........................ 704/254 |
| 2002/0107844 A1 * | | 8/2002 | Cha et al. ........................... 707/3 |
| 2003/0028367 A1 | | 2/2003 | Chalabi |
| 2003/0049592 A1 | | 3/2003 | Park |
| 2003/0050915 A1 | | 3/2003 | Allemang et al. |
| 2003/0177000 A1 | | 9/2003 | Mao et al. |
| 2003/0229497 A1 | | 12/2003 | Wilson et al. |
| 2004/0024739 A1 | | 2/2004 | Copperman et al. |

(Continued)

OTHER PUBLICATIONS

Patent Application, "Expanding Concept Types in Conceptual Graphs," inventors Bruce E. Peoples et al., 31 pages including drawings, filed Nov. 7, 2008.

(Continued)

*Primary Examiner* — Kimberly Wilson
(74) *Attorney, Agent, or Firm* — Daly, Crowley, Mofford & Durkee, LLP

(57) ABSTRACT

According to one embodiment, categorizing concept types of a conceptual graph includes receiving the conceptual graph comprising one or more concept types, one or more relationship types, and one or more arcs. Each concept type is categorized according to the relationship types and the arcs. The categorization of the each concept type is recorded.

18 Claims, 3 Drawing Sheets

(56) References Cited

U.S. PATENT DOCUMENTS

| | | | |
|---|---|---|---|
| 2004/0067471 A1 | 4/2004 | Bennett | |
| 2004/0093328 A1 | 5/2004 | Damle | |
| 2004/0107088 A1 | 6/2004 | Budzinski | |
| 2004/0236729 A1* | 11/2004 | Dingledine et al. | 707/3 |
| 2005/0192926 A1* | 9/2005 | Liu et al. | 707/1 |
| 2005/0278325 A1 | 12/2005 | Mihalcea et al. | |
| 2006/0074832 A1* | 4/2006 | Gardner et al. | 706/45 |
| 2006/0184516 A1 | 8/2006 | Ellis | |
| 2006/0235843 A1 | 10/2006 | Musgrove et al. | |
| 2007/0005343 A1 | 1/2007 | Sandor et al. | |
| 2007/0136251 A1 | 6/2007 | Colledge et al. | |
| 2007/0250493 A1 | 10/2007 | Peoples et al. | |
| 2007/0294223 A1 | 12/2007 | Gabrilovich et al. | |
| 2008/0033932 A1 | 2/2008 | DeLong et al. | |
| 2008/0270120 A1 | 10/2008 | Pestian et al. | |
| 2008/0270138 A1 | 10/2008 | Knight et al. | |
| 2009/0012928 A1 | 1/2009 | Lussier et al. | |
| 2009/0063473 A1 | 3/2009 | Van Den Berg et al. | |
| 2009/0089047 A1 | 4/2009 | Pell et al. | |
| 2009/0171876 A1 | 7/2009 | Tirri | |
| 2009/0254543 A1 | 10/2009 | Ber et al. | |
| 2009/0259459 A1 | 10/2009 | Ceusters et al. | |
| 2010/0070449 A1 | 3/2010 | Arnold et al. | |
| 2010/0115003 A1 | 5/2010 | Soules et al. | |
| 2010/0121884 A1 | 5/2010 | Peoples et al. | |
| 2010/0153092 A1 | 6/2010 | Peoples et al. | |
| 2010/0153367 A1 | 6/2010 | Peoples et al. | |
| 2010/0153368 A1 | 6/2010 | Peoples et al. | |
| 2010/0153369 A1 | 6/2010 | Peoples et al. | |
| 2010/0223276 A1 | 9/2010 | Al-Shameri et al. | |
| 2010/0287179 A1 | 11/2010 | Peoples et al. | |
| 2011/0040774 A1 | 2/2011 | Peoples et al. | |

OTHER PUBLICATIONS

Patent Application, "Applying Formal Concept Analysis to Validate Expanded Concept Types," inventors Bruce E. Peoples et al., 29 pages including drawings, filed Nov. 7, 2008.
Rodriguez et al.; "Determining Semantic Similarity among Entity Classes from Different Ontologies;" IEEE Transactions on Knowledge and Data Engineering, vol. 15, No. 2; Mar./Apr. 2003; pp. 442-456.
Office Action dated May 11, 2011; for U.S. Appl. No. 12/266,671; 11 pages.
Response filed Aug. 9, 2011; to Office Action dated May 11, 2011; for U.S. Appl. No. 12/266,671; 13 pages.
Office Action dated Sep. 16, 2011; for U.S. Appl. No. 12/266,617; 12 pages.
RCE and Response filed Nov. 16, 2011; to Office Action dated Sep. 16, 2011; for U.S. Appl. No. 12/266,617; 15 pages.
Office Action dated Mar. 15, 2011; for U.S. Appl. No. 12/266,724; 13 pages.
Response filed Jun. 10, 2011; to Office Action dated Mar. 15, 2011; for U.S. Appl. No. 12/266,724; 9 pages.
RCE with Response filed Nov. 30, 2011; for Office Action dated Sep. 1, 2011; for U.S. Appl. No. 12/266,724; 15 pages.
Response filed Mar. 15; to Office Action dated Jan. 9, 2012; for U.S. Appl. No. 12/266,724; 9 pages.
Office Action dated Aug. 2, 2011; for U.S. Appl. No. 12/335,260; 12 pages.
Office Action dated Jan. 20, 2012; for U.S. Appl. No. 12/335,260; 12 pages.
Response filed Mar. 22, 2012; for Office Action dated Jan. 20, 2012; for U.S. Appl. No. 12/335,260; 14 pages.
Office Action dated Mar. 29, 2011 for U.S. Appl. No. 12/355,283;13 pages.
Response filed Jul. 29, 2011; for Office Action dated Mar. 29, 2011 for U.S. Appl. No. 12/355,283; 12 pages.
Final Office Action dated Oct. 31, 2011; for U.S. Appl. No. 12/335,283; 14 pages.
Advisory Action dated Dec. 9, 2011; for U.S. Appl. No. 12/355,283; 13 pages.
Office Action dated May 26. 2011; for U.S. Appl. No. 12/541,244; 24 pages.
Response filed Aug. 25, 2011; to Office Action dated May 26, 2011; for U.S. Appl. No. 12/541,244; 14 pages.
Final Office Action dated Sep. 21, 2011; for U.S. Appl. No. 12/541,244; 24 pages.
Office Action dated Oct. 25, 2013, U.S. Appl. No. 12/335,283, 31 pages.
U.S. Appl. No. 12/266,671, filed Nov. 7, 2008, file through Jan. 7, 2013, Part 1, 513 pages.
U.S. Appl. No. 12/266,671, filed Nov. 7, 2008, file through Jan. 7, 2013, Part 2, 616 pages.
U.S. Appl. No. 12/266,724, filed Nov. 7, 2008, file through Jan. 7, 2013, Part 1, 382 pages.
U.S. Appl. No. 12/335,213, filed Dec. 15, 2008, file through Jan. 14, 2013, Part 1, 532 pages.
U.S. Appl. No. 12/335,213, filed Dec. 15, 2008, file through Jan. 14, 2013, Part 4, 532 pages.
U.S. Appl. No. 12/335,213, filed Dec. 15, 2008, file through Jan. 14, 2013, Part 9, 151 pages.
U.S. Appl. No. 12/335,239, filed Dec. 15, 2008, file through Jan. 11, 2013, 112 pages.
U.S. Appl. No. 12/335,260, filed Dec. 15, 2008, 557 pages.
U.S. Appl. No. 12/335,283, filed Jan. 16, 2009, 616 pages.
U.S. Appl. No. 12/541,244, filed Aug. 14, 2009, 659 pages.
Notice of Allowance and Issue Fee Due, U.S. Appl. No. 12/335,213, filed Dec. 15, 2008, pp. 1-16.
Notice of Allowance dated Jul. 19, 2012; for U.S. Appl. No. 12/266,724; 8 pages.
Office Action dated Aug. 1, 2012; for U.S. Appl. No. 12/266,671; 18 pages.
Office Action dated May 23, 2014 for U.S. Appl. No. 12/335,283, flied Dec. 15, 2003.
Request for Continued Examination and Response to Final Office Action filed on Feb. 16, 2012; for Final Office Action dated Sep. 1, 2011; for U.S. Appl. No. 12/266,671; 13 pages.
Office Action dated Apr. 26, 2012; for U.S. Appl. No. 12/335,260; 17 pages.
Final Office Action dated Apr. 23, 2012; for U.S. Appl. No. 12/541,244; 29 pages.

* cited by examiner

CATEGORIZING CONCEPT TYPES OF A CONCEPTUAL GRAPH

TECHNICAL FIELD

This invention relates generally to the field of information management and more specifically to categorizing concept types of a conceptual graph.

BACKGROUND

A corpus of data may hold a large amount of information, yet finding relevant information may be difficult. Key word searching is the primary technique for finding information. In certain situations, however, known techniques for keyword searching are not effective in locating relevant information.

SUMMARY OF THE DISCLOSURE

In accordance with the present invention, disadvantages and problems associated with previous techniques for searching documents may be reduced or eliminated.

According to one embodiment, categorizing concept types of a conceptual graph includes receiving the conceptual graph comprising one or more concept types, one or more relationship types, and one or more arcs. Each concept type is categorized according to the relationship types and the arcs. The categorization of the each concept type is recorded. In certain embodiments, a concept type may be categorized as a context linking concept or a concept object.

Certain embodiments of the invention may provide one or more technical advantages. A technical advantage of one embodiment may be that graph terms of a conceptual graph may be categorized. The categories may be used to identify related terms, which in turn may be used to search for documents. The generated categories may be used to identify related terms representing concept types, which in turn may be used to search for documents. Another technical advantage of one embodiment may be that the generated categories may be used to identify context between concept types, which in turn may be used to resolve referents of conceptual graphs.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 6 of the drawings, like numerals being used for like and corresponding parts of the various drawings.

Figure 1:
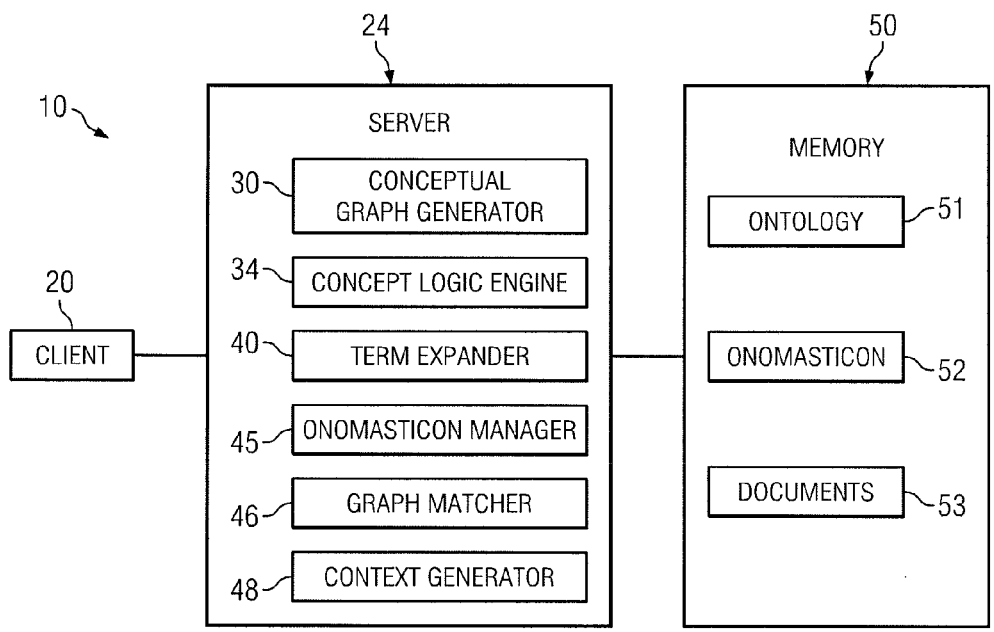
FIG. 1 illustrates one embodiment of a system configured to categorize concept types in a conceptual graph.

FIG. 1 illustrates one embodiment of a system 10 configured to categorize concept types in a conceptual graph. In certain embodiments, system 10 generates a query conceptual graph that may represent a search query. The query conceptual graph may include graph terms that represent concept types. A set of terms conceptually similar to the graph terms may be identified and used to perform a search. In certain embodiments, system 10 generates a document conceptual graph that may represent a document. The document conceptual graph may include graph terms that represent concept types. A set of terms conceptually similar to the graph terms may be identified and used to represent the document. The conceptually similar terms of a document may be compared with conceptually similar terms of a search. The document may be selected as a result of the search if the terms match.

In the illustrated embodiment, system 10 includes a client 20, a server 24, and a memory 50. Server 24 includes a conceptual graph generator 30, a term expander 40, an onomasticon manager 45, a graph matcher 46, a context generator 48, and a concept logic engine 34. Memory 50 includes an ontology 51, an onomasticon 52, and documents 53.

In particular embodiments, client 20 may send input to system 10 and/or receive output from system 10. In particular examples, a user may use client 20 to send input to system 10 and/or receive output from system 10. In particular embodiments, client 20 may provide output, for example, display, print, or vocalize output, reported by server 24, such as by term expander 30, conceptual graph generator 40, graph matcher 46, and/or context generator 48.

In particular embodiments, client 20 may send an input search query to system 10. An input search query may comprise any suitable message comprising one or more query terms that may be used to search for documents 53, such as a keyword query, or concept query based on keywords representing a concept. A term may comprise any suitable sequence of characters, for example, one or more letter, one or more numbers, and/or one or more other characters. An example of a term is a word.

Server 24 stores logic (for example, software and/or hardware) that may be used to perform the operations of system 10. In particular embodiments, conceptual graph generator 30 generates a query conceptual graph 60. A conceptual graph may be a graph that represents concept types expressed as terms (for example, specific instances of concept types) and the relationships among the concept types. An example of a query conceptual graph is described with reference to FIG. 2A.

Figure 2A:
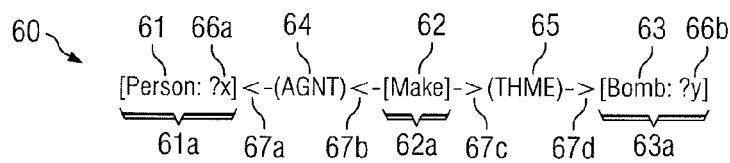
FIG. 2A illustrates an example of a query conceptual graph.

FIG. 2A illustrates an example of a query conceptual graph 60. Conceptual graph 60 includes nodes, such as concept nodes 61a, 62a, and/or 63a and conceptual relation nodes 64 and/or 65, coupled by arcs 67 (67a, 67b, 67c, and/or 67d). The nodes include graph terms that represent concept types. A concept node 61a, 62a, and/or 63a represents a concept, and may include a concept type and a concept referent, which may be a specific instance of a concept type. The concept type may specify a concept, and the referent may designate a specific entity instance of the concept type.

In the illustrated example, concept node 61a includes concept type 61 "Person" and concept referent 66a "?x", which is an unknown concept referent. Concept node 62a includes concept type 62 "Make", but no concept referent. Concept node 63a includes concept type 63 "Bomb", and concept referent 66b "?y", which is an unknown concept referent. Concept types may be expressed as subjects, direct objects, verbs, or any suitable part of language. In the illustrated example, concept type 61 is a direct object represented by the term "Person", concept type 62 is a verb represented by the term "Make", and concept type 63 is a direct object represented by the term "Bomb".

In some embodiments, concept type 62 may be regarded as a context linking concept (or a "linking concept term"). A context linking concept may provide a context between other concept types 61 and 63. In the example, "Make" links "Person" and "Bomb," yielding "Person" "Makes" "Bomb."

Conceptual relation nodes 64 and/or 65 represent relationships between concept nodes 61a, 62a, and/or 63a, and arcs 67 represent the direction of the relationships. In the illustrated example, conceptual relation node 64 "Agent" represents an agent relationship between concept nodes 61a and 62a. Arc 67a indicates that "Person:?x" is the agent of the action "Make". Conceptual relation node 65 "THME" represents a theme relation between concept nodes 62a and 63a. Arc 67d indicates that "Bomb:?y" is the theme of the action "Make".

In particular embodiments, the concepts and the relationships among the concepts of conceptual graph 60 may be expressed in text. In certain embodiments, square brackets may be used to indicate concept nodes 61a, 62a, and/or 63a, and parentheses may be used to indicate relation nodes 64 and/or 65. Hyphens and/or arrows may be used to indicate arcs 67. In the illustrated example, the concepts and relationships may be expressed as:

[Person: ?x]←(Agent)←[Make]→(THME)→[Bomb:?y]

Referring back to FIG. 1, in particular embodiments, conceptual graph generator 30 may generate a document conceptual graph 300 for a document. An example of a document conceptual graph 300 is described in more detail with reference to FIG. 2B.

Figure 2B:
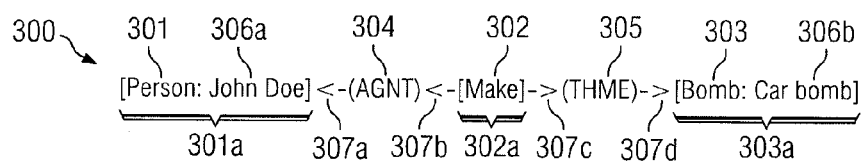
FIG. 2B illustrates an example of a document conceptual graph.

FIG. 2B illustrates an example of a document conceptual graph 300. In the illustrated example, document conceptual graph 300 includes nodes, such as concept nodes 301a, 302a, and/or 303a and conceptual relation nodes 304 and/or 305, coupled by arcs 307 (307a, 307b, 307c, and/or 307d). In the illustrated example, concept node 301a includes concept type 301 "Person" and concept referent 306a "John Doe". Concept node 302a includes concept type 302 "Make", but no concept referent. Concept node 303a includes concept type 303 "Bomb", and concept referent 306b "Car bomb".

In the illustrated example, conceptual relation node 304 "Agent" represents an agent relationship between concept nodes 301a and 302a. Arc 307a indicates that "Person: John Doe" is the agent of the action "Make". Conceptual relation node 305 "THME" represents a theme relation between concept nodes 302a and 303a. Arc 307d indicates that "Bomb: Car bomb" is the theme of the action (or context liking concept) "Make".

In the illustrated example, the concepts and relationships of document conceptual graph 300 may be expressed as:

[Person: John Doe]←(Agent)←[Make]→(Theme)→[Bomb: Car bomb]

In the illustrated example, document conceptual graph 300 may represent some or all of a retrieved document that includes information about "Person (specified as John Doe) "Makes" a "Bomb" (specified as Car bomb)."

Referring back to FIG. 1, conceptual graph generator 30 may perform other suitable operations. In particular embodiments, conceptual graph generator may include an entity extractor that can extract concept types and/or referents to construct graphs.

In particular embodiments, term expander 40 expands terms representing concept types of conceptual graph 60 and/or 300. Term expander 40 may expand the terms by identifying, for each term, a set of terms conceptually similar to the term. Term expander 40 may use an ontology 51 to identify the conceptually similar terms. A search query may be formed using the conceptually similar terms. Term expander 40 may be any suitable term expander, such as the Semantic Reverse Query Expander from RAYTHEON COMPANY. Term expander 40 may include a concept logic engine 34, which may analyze terms for suitability. Any suitable concept logic engine 34 may be used, for example, the CYC KNOWLEDGE BASE from CYCORP, INC.

Conceptually similar terms may be terms that are, for example, within the semantic context of each other. Examples of conceptually similar terms include synonyms, hypernyms, holonyms, hyponyms, merronyms, coordinate terms, verb participles, troponyms, and entailments. Conceptually similar terms may be in the native language of the search (for example, English) and/or a foreign language (for example, Arabic, French, or Japanese). In one embodiment, a foreign language term may be a foreign language translation of a native language term related to a conceptual graph.

A conceptually similar term (CST) of a term may be expressed as CST(term). For example, CST (Person) is Human.

In the illustrated example, examples of conceptually similar terms for query concept graph and/or 300 may be as follows:

CST(Person): Individual, Religious individual, Engineer, Warrior, etc.

CST(Make): Building, Build, Create from raw materials, etc.

CST(Bomb): Explosive device, Car bomb, Pipe bomb, etc.

The conceptually similar terms may include the following Arabic terms (English translation in parentheses):

CST(Person): شخص (Person), فرد (Individual), فرد دينية (Religious individual), المهندس (Engineer), الناس الحارب (Warrior), etc.

CST(Make): تقدم (Make), بنا (Building), يبني (Build), خلق من المواد الخام (Create from raw materials), etc.

CST(Bomb): قنبلة (Bomb), عبوة ناسفة (Explosive device), سيارة مفخخة (Car bomb), انبوبية قنبلة (Pipe bomb), etc.

In particular embodiments, onomasticon manager 45 manages onomasticon 52. Onomasticon manager 45 may manage information in onomasticons 52 by performing any suitable information management operation, such as storing, modifying, organizing, and/or deleting information. In particular embodiments, onomasticon manager 45 may perform the following mappings: a query conceptual graph to a search query, a set of conceptually similar terms to a concept type of a conceptual graph, a set of conceptually similar terms to a search query, a word sense of conceptually similar terms to a concept type, terms representing a context linking concept, terms representing a concept object, and/or a set of conceptually similar terms to a word sense. Onomasticon manager 45 may perform the operations at any suitable time, such as when information is generated or validated. In particular embodiments, onomasticon manager 54 may send information to concept logic engine 34 for use in expanding terms and/or determining referents for concept types.

In particular embodiments, graph matcher 46 may compare query conceptual graphs 60 and document conceptual graphs 300 to see if graphs 60 and 300 match in order to select documents that match the search query. In particular embodiments, expanded document conceptual graphs 300 and expanded query conceptual graphs 60 may be compared.

Graphs may be regarded as matching if one, some, or all corresponding terms associated with the graphs match. Terms associated with a graph may include terms representing concept types of the graph and/or terms that are conceptually similar to the terms representing the concept types. Corresponding concept nodes may be nodes in the same location of a graph. For example, node 61*a* of graph 60 corresponds to node 301*a* of graph 300.

In the example, nodes 61*a*, 62*a*, 63*a*, 64, and/or 65 of conceptual graph 60 may match nodes 301*a*, 302*a*, 303*a*, 304, and/or 305 of conceptual graph 300 if the concept types and/or relations of nodes 61*a*, 62*a*, 63*a*, 64, and/or 65 match that of nodes 301*a*, 302*a*, 303*a*, 304, and/or 305, respectively. In the example, conceptual graphs 60 and 300 may be regarded as matching.

In particular embodiments, graph matcher 46 may validate a match using onomasticons 52. In certain examples, graph matcher 46 may determine whether conceptually similar terms of graphs 60 and 300 map to the same concept type in one or more onomasticons 52. If they do, the match may be regarded as valid. In certain examples, the conceptually similar terms of graphs 60 and 300 may be in the same or different onomasticons 52.

In particular embodiments, if a document conceptual graph 300 representing a document 53 matches query conceptual graphs 60, graph matcher 46 may select document 53 to report to client 20.

In particular embodiments, context generator 48 may be used to categorize concept types and terms representing concept types as context linking concepts or concept objects. Context generator 48 may also assist logic engine 24 in retrieving referents for concept types.

Figure 3:
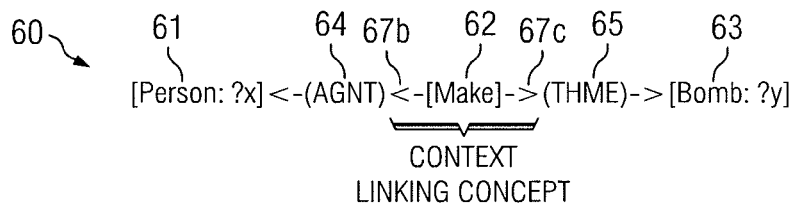
FIG. 3 illustrates an example of a categorized context linking concept of the conceptual graph of FIG. 2A.

FIG. 3 illustrates an example of a categorized context linking concept of conceptual graph 60 of FIG. 2. In particular embodiments, context generator 48 may categorize concept type 62 as a context linking concept to identify the context between other concept types 61 and 63.

Context generator 48 may categorize a context linking concept by determining if a concept type 62 fits a context linking concept pattern. In particular embodiments, if a concept type 62 is directly connected to two or more relationship types 64 and 65 by arcs 67*b* and 67*c* pointing in different directions (such as in opposite directions or away from concept type 62), then concept type 62 may be designated as a context linking concept. In the illustrated embodiment, "Make" is directly connected to "AGNT" and "THEME" by arcs 67*b* and 67*c* pointing in opposite directions, so "Make" may be designated as a context linking concept.

In particular embodiments, onomasticon manager 45 may map the context linking concept designation to concept type 62 and to terms representing concept type 62 in onomasticon 52. For example, the context linking concept designation may be mapped to "Make" and to terms representing "Make".

Figure 4:
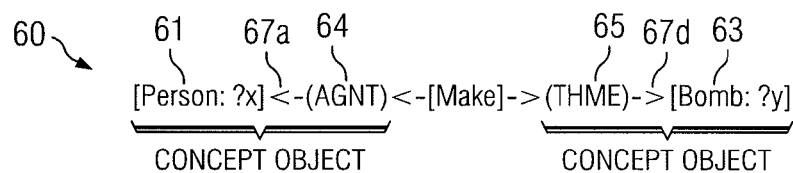
FIG. 4 illustrates an example of a concept object of the conceptual graph of FIG. 2A.

FIG. 4 illustrates an example of a concept object of conceptual graph 60 of FIG. 2. In particular embodiments, context generator 48 may categorize a concept object by determining if a concept type 62 fits a concept object pattern. In particular embodiments, if a concept type 61 or 63 is directly connected to one or more relationship types 64 or 65 by one or more arcs 67*a* or 67*d* pointing in substantially the same direction, then concept type 61 or 63 may be designated as a concept object. In the illustrated embodiment, "Person" is directly connected to "AGNT" by arc 67*a*, so "Person" may be designated as a concept object. Similarly, "Bomb" is directly connected to "THME" by arc 67*d*, so "Bomb" may be designated as a concept object.

In particular embodiments, onomasticon manager 45 may map the concept object designation to concept type 61 or 63 and to terms representing concept type 61 or 63 in onomasticon 52. For example, the concept object designation may be mapped to "Person" and "Bomb" and to terms representing "Person" and "Bomb."

Returning to FIG. 1, concept logic engine 34 may use the mappings of categorized concept objects and context linking concepts in onomasticon 52 for use in expanding terms and/or determining referents for concept types.

Memory 50 includes ontology 51, onomasticon 52, and documents 53. Ontology 51 stores terms, attributes of terms, word senses (or definitions) of terms, and relationships among the terms. Ontology 51 may be used (for example, by term expander 40) to determine the appropriate terms, attributes, and relationships. For example, ontology 51 may describe the semantically related terms of a term and the relationships that the term may have with other terms. Relationships may include such as synonyms, hypernyms, holonyms, hyponyms, merronyms, coordinate terms, verb participles, troponyms, and entailments. For example, ontology 51 may store the conceptually similar terms for "Person", "Make", and "Bomb" as described above. Ontology 51 may include one or more knowledge bases (KBs), knowledge stores (KSs) or databases (DBs).

Figure 5:
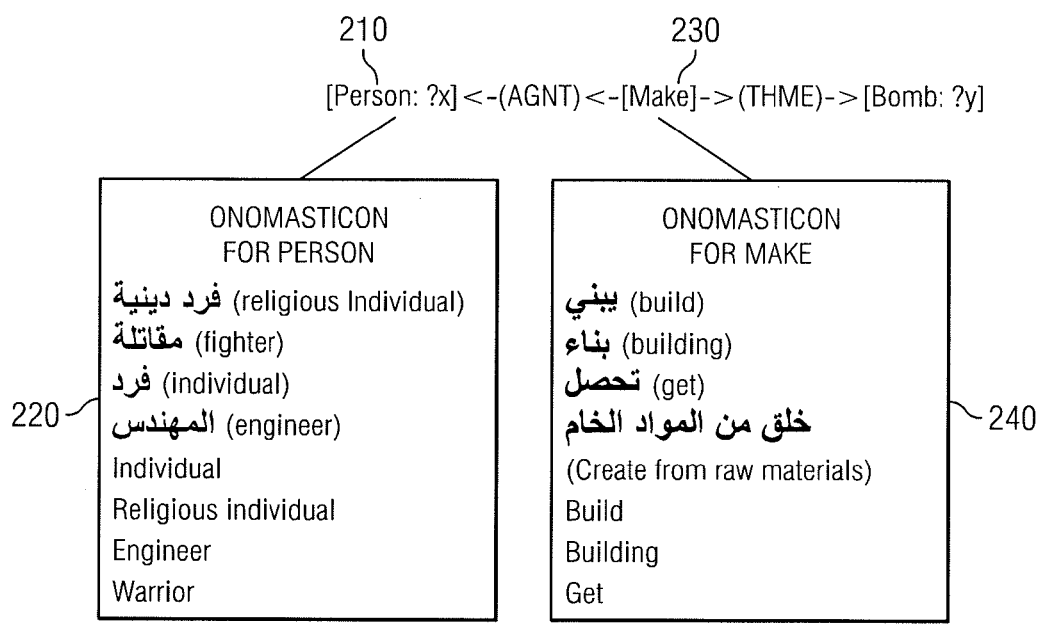
FIG. 5 illustrates an example of onomasticons that may be used for the conceptual graph of FIG. 2A.

Onomasticon 52 records information resulting from the operations of system 10 in order to build a knowledge base of conceptually similar terms to represent concept types found in conceptual graphs. Onomasticon 52 may store mappings of the conceptually similar terms to the concept types. In particular embodiments, information in onomasticon 52 may be used for future searches. For example, term expander 40 may retrieve conceptually similar terms mapped to a term from onomasticon 52. FIG. 5 illustrates an example of onomasticon 52.

FIG. 5 illustrates an example of onomasticons 220 and 240 that may be used for a query conceptual graph 60. Onomasticon 220 stores conceptually similar English and foreign language terms, such as Arabic terms, for the concept type [Person] 210. These terms may include Individual, Religious individual, Engineer, Warrior, فرد (Individual), فرد دينية (Religious individual), المهندس (Engineer), and مقاتلة (Fighter).

Onomasticon 240 stores conceptually similar English and foreign language terms, such as Arabic terms, for the concept type [Make] 230. These terms may include يبني (build), بنا (building), تحصل (get), خلق من المواد الخام (Create from raw materials), Build, Building, and Get.

Referring back to FIG. 1, a document 53 may refer to a collection of terms (such as words), and may be stored electronically. Documents 53 may include documents in a native language and/or a foreign language.

A component of system 10 may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as a processor, may manage the operation of a component. Examples of a processor include one or more computers, one or more microprocessors, one or more applications, and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to system 10 without departing from the scope of the invention. The components of system 10 may be integrated or separated. Moreover, the operations of system 10 may be performed by more, fewer, or other components. For example, the operations of conceptual graph generator 30 and term expander 40 may be performed by one component, or the operations of onomasticon manager 45 may be performed by more than one component. Additionally, operations of system 10 may be performed using any suitable logic comprising software, hardware, and/or other logic. As used in this document, "each" refers to each member of a set or each member of a subset of a set.

Figure 6:
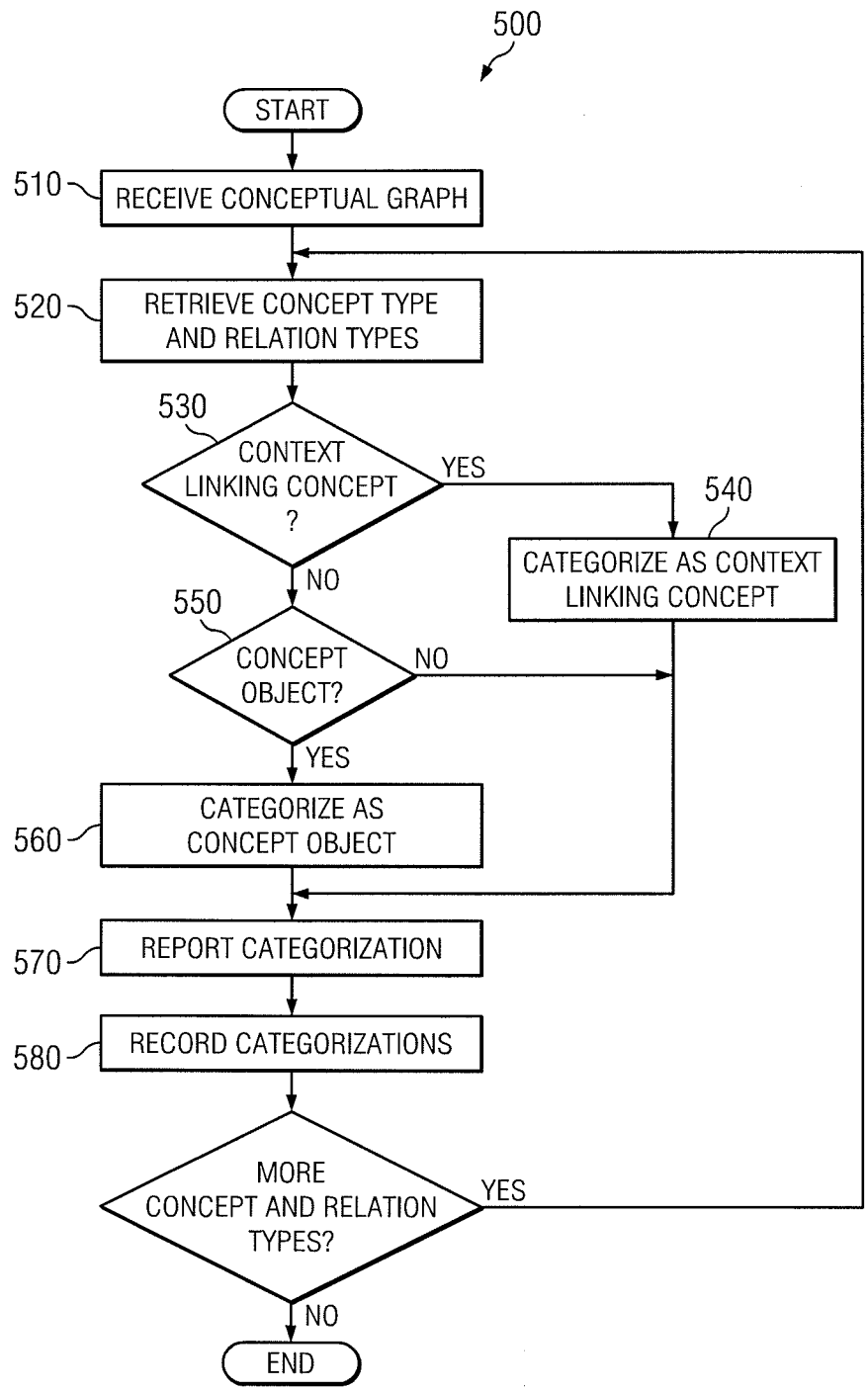
FIG. 6 illustrates a flow chart of a method for categorizing concept types of a conceptual graph.

FIG. 6 illustrates a flow chart 500 of a method for categorizing concept types of a conceptual graph. At step 510, context generator 48 receives a conceptual graph 60 generated by conceptual graph generator 30. Context generator 48 retrieves the concept types and one or more relation types from conceptual graph 60 at step 520.

At step 530, context generator 48 determines if a retrieved concept type is a context linking concept. For example, context generator 48 may determine whether the retrieved concept type fits a context linking concept pattern. If the retrieved concept type is a context linking concept, the method proceeds to step 540, where context generator 48 designates the retrieved concept type as a context linking concept. The method then proceeds to step 570. If the retrieved concept type is not a context linking concept, the method proceeds to step 550.

At step 550, context generator 48 determines if a retrieved concept type is a concept object. For example, context generator 48 may determine whether the retrieved concept type fits a concept object pattern. If the retrieved concept type is a concept object, the method proceeds to step 560, where context generator 48 designates the retrieved concept type as a concept object. The method then proceeds to step 570. If the retrieved concept type is not a context linking concept, the method proceeds directly to step 570.

Context generator 48 reports the categorization to onomasticon manager 45 at step 570. At step 580, onomasticon manager 45 maps the categorizations to the terms to record the categorizations. For example, onomasticon manager 45 may map the categorization of a term to the term and to other terms semantically related to the term.

Conceptual graph 60 may have more concept types and relation types. If so, the method returns to step 520, where context generator 48 retrieves the next concept types and one or more relation types. Is not, the method ends.

Modifications, additions, or omissions may be made to the method without departing from the scope of the invention. The method may include more, fewer, or other steps. Additionally, steps may be performed in any suitable order.

Certain embodiments of the invention may provide one or more technical advantages. A technical advantage of one embodiment may be that graph terms of a query conceptual graph may be categorized. The categories may be used to identify related terms, which in turn may be used to search for documents.

Certain embodiments of the invention may include none, some, or all of the above technical advantages. One or more other technical advantages may be readily apparent to one skilled in the art from the figures, descriptions, and claims included herein.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed:

1. A method implemented in a computer system comprising one or more processors in operable communication with one or more non-transitory, tangible, computer-readable storage media, at least a first one of the non-transitory, tangible computer-readable storage media storing instructions executable by at least one processor, the method comprising:
  receiving, at the processor, a conceptual graph comprising one or more concept types, one or more relationship types, and one or more arcs;
  causing the processor to execute one or more instructions configured to:
    categorize each concept type of the one or more concept types according to the one or more relationship types and the one or more arcs, wherein the categorizing each concept type further comprises:
      determining that each concept type is directly connected to two or more relationship types by two or more arcs pointing in different directions; and
      categorizing the each concept type as a context linking concept;
    record in a second respective one of the non-transitory, tangible, storage media, the categorization of the each concept type of the one or more concept types;
    identify, based on a respective database of terms stored in a third respective one of the non-transitory, tangible storage media, one or more related terms of at least one particular concept type of the one or more concept types according to the categorization; and
    searching a plurality of documents in a fourth respective one of the non-transitory, tangible, storage media, for matches to the identified one or more related terms of the at least one particular concept type according to the categorization.

2. The method of claim 1, the categorizing each concept type further comprising:

determining that each concept type fits a context linking concept pattern.

3. The method of claim 1, the categorizing each concept type further comprising:
determining that each concept type fits a concept object pattern; and
categorizing each concept type as a concept object.

4. The method of claim 1, the categorizing each concept type further comprising:
determining that each concept type is directly connected to one or more relationship types by one or more arcs pointing in the same direction; and
categorizing the each concept type as a concept object.

5. The method of claim 1, the recording the categorization further comprising:
mapping, to each related term, a category designation designating the category of the related term.

6. The method of claim 1, the recording the categorization further comprising:
recording the categorization in an onomasticon.

7. The method of claim 1, the recording the categorization further comprising:
mapping, for each related term, a category designation designating the category of each related term to a term semantically related to each related term.

8. The method of claim 1, the conceptual graph comprising a query conceptual graph generated from a search query.

9. The method of claim 1, wherein:
a document conceptual graph represents a first document of the plurality of documents;
the document conceptual graph comprises one or more document concept types; and
searching the plurality of document concept types further comprises:
identifying one or more related terms of a document concept type;
comparing the one or more related terms of the document concept type to the identified one or more related terms of the at least one particular concept type according to the categorization; and
selecting the first document as a result of a search based on the comparison of the one or more related terms of the document concept type to the identified one or more related terms of the at least one particular concept type according to the categorization.

10. A non-transitory, tangible, computer-readable storage medium storing computer-executable instructions, wherein the computer-executable instructions, when executed by one or more processors, are operable to:
receive a conceptual graph comprising one or more conceptual types, one or more relationship types, and one or more arcs;
categorize each concept type of the one or more concept types according to the one or more relationship types and the one or more arcs, the computer-executable instructions further configured to categorize each concept type by:
determining that each concept type is directly connected to two or more relationship types by two or more arcs pointing in different directions; and
categorizing the each concept type as a context linking concept;
record, in a non-transitory, tangible computer-readable memory device, the categorization of each concept type of the one or more concept types;
identify one or more related terms of at least one particular concept type of the one or more concept types according to the categorization; and
search a non-transitory, tangible computer-readable knowledgebase for a plurality of documents for matches to the identified one or more related terms of the at least one particular concept type according to the categorization.

11. The non-transitory, tangible, computer-readable storage medium of claim 10, the computer-executable instructions configured to categorize each concept type by:
determining that the each concept type fits a context linking concept pattern.

12. The non-transitory, tangible, computer-readable storage medium of claim 10, the computer-executable instructions further configured to categorize each concept type by:
determining that each concept type fits a concept object pattern; and
categorizing each concept type as a concept object.

13. The non-transitory, tangible, computer-readable storage medium of claim 10, the computer-executable instructions further configured to categorize each concept type by:
determining that each concept type is directly connected to one or more relationship types by one or more arcs pointing in the same direction; and
categorizing each concept type as a concept object.

14. The non-transitory, tangible, computer-readable storage mediums of claim 10, the computer-executable instructions further configured to record the categorization by:
mapping, to each related term, a category designation designating the category of the related term.

15. The non-transitory, tangible, computer-readable storage medium of claim 10, the computer-executable instructions further configured to record the categorization by:
recording the categorization in an onomasticon.

16. The non-transitory, tangible, computer-readable storage mediums of claim 10, the computer-executable instructions further configured to record the categorization by:
mapping, for each related term, a category designation designating the category of each related term to a term semantically related to each related term.

17. The non-transitory, tangible, computer-readable storage medium of claim 10, the conceptual graph comprising a query conceptual graph generated from a search query.

18. The non-transitory, tangible, computer-readable storage medium of claim 10, wherein:
a document conceptual graph represents a first document of the plurality of documents;
the document conceptual graph comprises one or more document concept types; and
the logic is further configured to search the plurality of documents by:
identifying one or more related terms of a document concept type;
comparing the one or more related terms of the document concept type to the identified one or more related terms of the at least one particular concept type according to the categorization; and
selecting the first document as a result of a search based on the comparison of the one or more related terms of the document concept type to the identified one or more related terms of the at least one particular concept type according to the categorization.

* * * * *